United States Patent [19]

Midgley

[11] Patent Number: 5,152,059
[45] Date of Patent: Oct. 6, 1992

[54] MANUFACTURE OF COOLED AEROFOIL BLADES

[75] Inventor: Ronald A. Midgley, St. Albans, England

[73] Assignee: Rolls-Royce plc, London, England

[21] Appl. No.: 291,829

[22] Filed: Jul. 16, 1981

[30] Foreign Application Priority Data

Sep. 19, 1980 [GB] United Kingdom ................ 8030435

[51] Int. Cl.$^5$ ............................................. B21C 37/00
[52] U.S. Cl. ............................... 29/889.7; 29/889.721; 228/164; 228/170; 228/171
[58] Field of Search ................... 29/156.8 T, 156.8 H, 29/156.8 B, 889.7, 889.721; 228/171, 170, 164

[56] References Cited

U.S. PATENT DOCUMENTS

| | | | |
|---|---|---|---|
| 3,588,980 | 6/1971 | Cogan | 29/156.8 B |
| 3,628,226 | 12/1971 | Nelson | 29/156.8 H |
| 3,656,222 | 4/1972 | Jones | 29/156.8 B |
| 3,736,638 | 6/1973 | Stone | 29/156.8 H |
| 3,912,151 | 10/1975 | Martin et al. | 228/171 |
| 4,040,159 | 8/1977 | Darrow et al. | 29/156.8 H |

FOREIGN PATENT DOCUMENTS 538240 7/1941 United Kingdom ................ 228/171

*Primary Examiner*—Brooks H. Hunt
*Assistant Examiner*—Daniel S. Jenkins
*Attorney, Agent, or Firm*—Cushman, Darby & Cushman

[57] ABSTRACT

A method of manufacturing cooled aerofoil blades in which blade parts are bonded together to provide complete blades. The blade parts are provided with mating surfaces which are simultaneously spark erosion machined to match the same prior to the blade parts being brazed together. Spark erosion machining is performed by maintaining the mating surfaces to be matched at a constant distance apart from each other and translating a tensioned wire electrode along a path passing midway between the mating surfaces.

5 Claims, 2 Drawing Sheets

MANUFACTURE OF COOLED AEROFOIL BLADES

This invention relates to the manufacture of cooled aerofoil blades and in particular to the manufacture of serofoil blades adapted to be cooled by the passage of a cooling fluid therethrough and which are intended for use in gas turbine engines.

It is common practice to provide aerofoil blades in gas turbine engines which are adapted to be cooled by the passage of a cooling fluid, usually air, through them. This entails providing such aerofoil blades with a network of internal passageways which are so configured as to direct the cooling fluid to those areas of the blade which require cooling. However as a result of the difficulties in forming such passageways either by machining methods or, if the aerofoil blade is cast, by suitable moulding techniques, the actual internal passageway configuration often has to be one which is not the optimum for effective cooling.

It has been suggested that the provision of internal cooling passages in aerofoil blades can be greatly simplified by making each blade in two longitudinally separated parts by either casting or machining and then joining the two parts together by, for instance, brazing to provide a complete blade. Each blade part is provided on its mating surface with channels which, when the blade parts are joined, define the internal cooling passages. The problem with this method of aerofoil blade manufacture however is that in order to ensure an effective bond between the two blade parts, their mating surfaces must be closely matched. Conventional machining techniques are frequently unable to provide the necessary degree of matching so that the integrity of the resultant aerofoil blade cannot be relied upon.

It is an object of the present invention to provide a method of manufacturing aerofoil blades from blade parts in which the degree of matching of the mating surfaces of the blade parts is improved.

According to the present invention, a method of manufacturing a cooled aerofoil blade from a plurality of aerofoil blade parts having corresponding mating surfaces and corresponding channels in said mating surfaces which channels are adapted to define cooling passages when said mating surfaces are brought together, comprises fixing said blade parts in a spaced apart relationship so that said mating surfaces are aligned and adjacent each other, translating a tensioned wire electrode along a path passing mid-way between said corresponding mating surfaces whilst simultaneously applying a potential difference between said wire electrode and said blade parts so that sparking occurs between said wire electrode and said corresponding mating surfaces, said potential difference being of such a magnitude that said corresponding mating surfaces are simultaneously eroded by said sparking, said wire electrode being so dimensioned and said corresponding mating surfaces being so configured as to facilitate said simultaneous spark erosion of said corresponding mating surfaces upon translation of said tensioned electrode along said path, removing said electrode, and subsequently bringing together said corresponding mating surfaces and bonding them together.

Said blade parts may be so formed that said mating surfaces are planar.

Each of said blade parts may be provided with a plurality of planar mating surfaces, which surfaces are parallel with the path of said wire electrode but are angularly disposed with respect to each other.

Said blade parts may be bonded together by brazing.

Said wire electrode is preferably a consumable electrode.

The invention will now be described, by way of example, with reference to the accompanying drawings in which.

Figure 1:
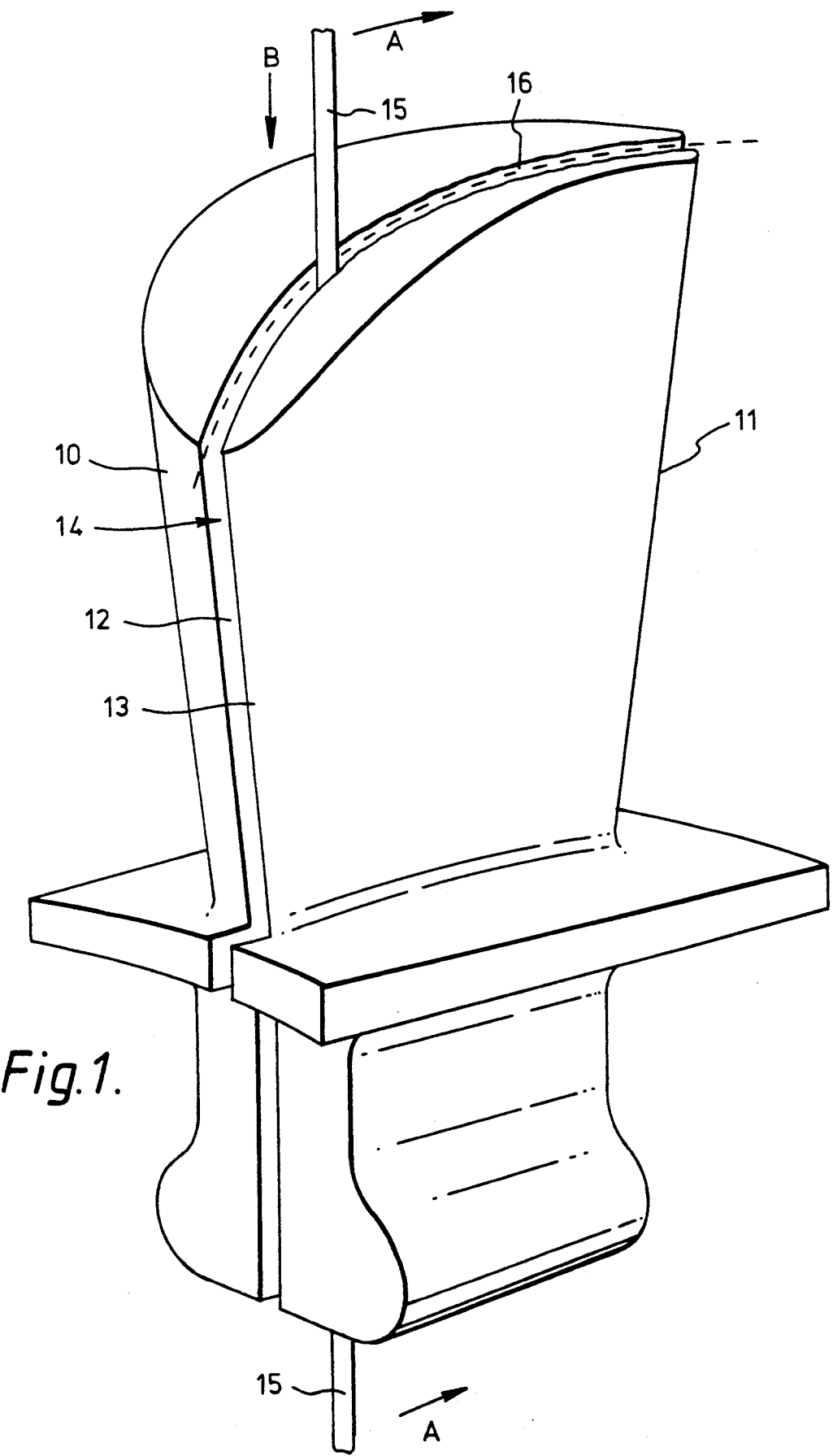
FIG. 1 is a view of two aerofoil blade parts being spark eroded in accordance with the method of the present invention.

With reference to FIG. 1, two aerofoil blade parts 10 and 11 are so configured that if they are brought together, they define a complete aerofoil blade. The blade parts 10 and 11 are castings which are so constructed that they are provided with corresponding mating surfaces 12 and 13 respectively which abut when the two blade parts 10 and 11 are brought together to define a complete aerofoil blade. The mating surfaces 12 and 13 are provided in turn with corresponding channels (not shown) which, when the blade part 10 and 11 are brought together, define cooling passages within the resultant aerofoil blade.

Such blade parts which define complete aerofoil blades having cooling passages when brought together in this manner are well known. However the present invention is concerned with a method of machining the corresponding mating surfaces 12 and 13 which ensures that when the blade parts 10 and 11 are brought together, they are closely matched. To this end, the blade parts 10 and 11 are held (by means ommitted in the interest of clarity) in such a manner that there is a substantially constant gap 14 between the mating surfaces 12 and 13. A tensioned wire electrode 15 having a diameter which is smaller than the distance across the gap 14, is then caused to translate in the direction indicated by arrows A along a path 16 which passes mid-way between the mating surfaces 12 and 13. It will be appreciated however that the requirement that the diameter of the wire electrode 15 is smaller than the distance across the gap 14 is not an essential one and that the wire electrode 15 diameter could in fact be greater than the distance across the gap 14. During the translation of the wire electrode 15 along the path 16, a potential difference is maintained between the wire electrode 15 and each of the aerofoil blade parts 1 and 11. The potential difference is of such a magnitude that sparking occurs between the wire electrode 15 and the mating surfaces 12 and 13, thereby causing simultaneous spark erosion of those surfaces 12 and 13. The wire electrode 15 is of the consumable type so that as it translates along the path 16 it is also driven in the direction indicated by arrow B so that new electrode is continuously brought into operation.

The resultant simultaneous spark erosion of the mating surfaces 12 and 13 ensures that the mating surfaces 12 and 13 are accurately matched so as to provide a close fit when the blade parts 10 and 11 are brought together. Thus by spark eroding both mating surfaces 12 and 13 simultaneously, any errors due to the wire electrode 15 not following the path 16 exactly will be compensated for. A further advantage of the method is that the spark erosion machining is halved when compared with spark erosion machining the blade parts 10 and 11 individually.

Figure 2:
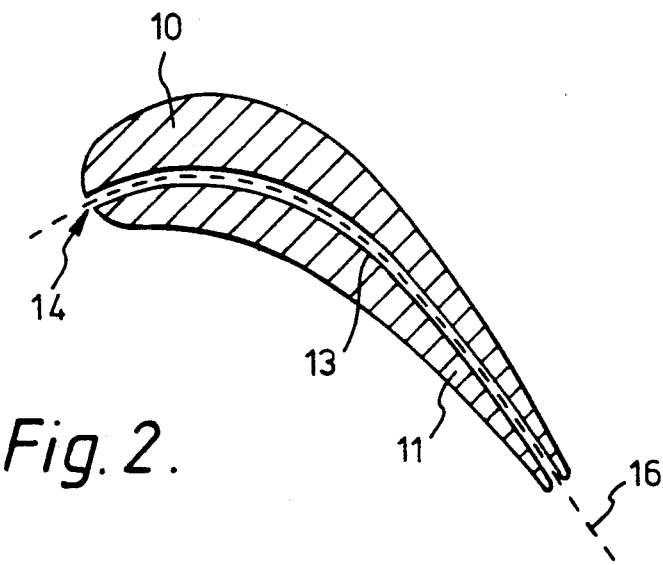
FIG. 2 is a plan view of the aerofoil section defined by the two aerofoil blade parts shown in FIG. 1.
Figure 3:
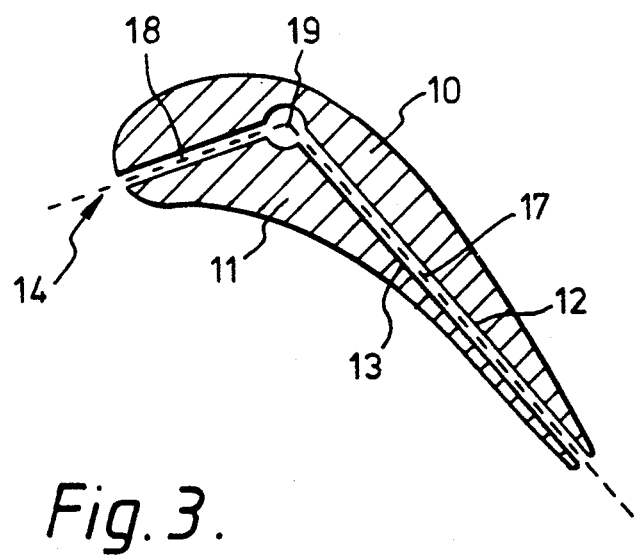
FIG. 3 is a plan view of an alternative form of the two aerofoil blade parts shown in FIG. 2.

The path 16 which is followed by the wire electrode 15 is, as can be seen more clearly in FIG. 2, generally curved. This ensured that since the wire electrode 15 extends in a generally lengthwise direction with regard to the blade parts 10 and 11, the whole of both mating surfaces 12 and 13 may be simultaneously spark eroded in a single pass of the wire electrode 15 along that path 16. There are disadvantages however in causing the wire electrode 15 to follow a curved path, the most important of which is that an exact fit between the mating surfaces 12 and 13 is not possible. This problem may however be avoided by providing two straight paths 17 and 18 for the wire electrode 15 which are angularly disposed with respect to each other and intersect at a hole 19 arranged to pass longitudinally through the assembly aerofoil blade. This means that the mating surfaces 12 and 13 in this particular arrangement are planar and therefore provide an exact match when the blade parts 10 and 11 are fitted together. It will be appreciated that it may be possible to provide more than two straight paths for the wire electrode 15 depending upon the particular configurations of the aerofoil blades parts 10 and 11.

After the mating surfaces 12 and 13 of the two aerofoil blade parts have been spark erosion machined by the wire electrode 15 so as to be accurately matched, the wire electrode 15 is removed and the aerofoil blade parts 10 and 11 are bonded together by brazing. It will be appreciated however that other techniques such as electron beam welding or diffusion bonding could alternatively be used to bond the aerofoil blade parts 10 and 11 together if so desired.

I claim:

1. A method of manufacturing a cooled aerofoil blade from a plurality of aerofoil blade parts having corresponding mating surfaces to be matched and having corresponding channels formed in said mating surfaces which channels define cooling passages when said mating surfaces are matched and brought together, said method comprising the steps of: fixing said blade parts in a spaced apart relationship so that said mating surfaces to be matched are aligned and adjacent each other and define a path; translating a tensioned wire electrode along said path passing mid-way between said corresponding mating surfaces while simultaneously applying a potential difference between said wire electrode and said blade parts so that sparking occurs between said wire electrode and said corresponding mating surfaces to provide simultaneous erosion of said surfaces by said sparking, said wire electrode being so dimensioned and said corresponding mating surfaces being so configured as to facilitate said simultaneous spark erosion of said corresponding mating surfaces upon translation of said tensioned electrode along said path to form corresponding matched mating surfaces removing said electrode and subsequently bringing together said simultaneous spark erosion matched mating surfaces; and bonding said matched mating surfaces together.

2. A method of manufacturing a cooled aerofoil blade as claimed in claim 1 wherein said blade parts are so formed that said corresponding mating surfaces to be matched are planar.

3. A method of manufacturing an aerofoil blade as claimed in claim 2 wherein each of said blade parts is provided with a plurality of planar mating surfaces to be matched, which plurality of planar mating surfaces are parallel with the path of said wire electrode but are angularly disposed with respect to each other.

4. A method of manufacturing a cooled aerofoil blade as claimed in claim 1 wherein said blade parts are bonded together by brazing.

5. A method of manufacturing a cooled aerofoil blade as claimed in claim 1 wherein said wire electrode is a consumable electrode and is moved in an axial direction transverse to the translating of the electrode along said path.

* * * * *